United States Patent [19]

Grodde

[11] 3,959,647
[45] May 25, 1976

[54] GAMMA-RAY MEASURING METHOD FOR DETERMINING AN INTERFACE BETWEEN MEDIA

[75] Inventor: Karl-Heinz Grodde, Celle, Germany

[73] Assignee: Deutsche Texaco Aktiengesellschaft, Hamburg, Germany

[22] Filed: Dec. 13, 1974

[21] Appl. No.: 532,554

[30] Foreign Application Priority Data
Dec. 21, 1973   Germany............................ 2363783

[52] U.S. Cl. ............................................. 250/258
[51] Int. Cl.² .......................................... G01V 5/00
[58] Field of Search..................... 250/258, 259, 260

[56] References Cited
UNITED STATES PATENTS
3,100,258   8/1963   Brink et al. .......................... 250/258

Primary Examiner—Davis L. Willis
Attorney, Agent, or Firm—T. H. Whaley; C. G. Ries; Kenneth R. Priem

[57] ABSTRACT

The interface between two fluids such as oil and water in an underground cavern may be detected by placing a gelled substance containing a source of gamma radiation at the interface and detecting the emissions from the gelled substance.

6 Claims, No Drawings

GAMMA-RAY MEASURING METHOD FOR DETERMINING AN INTERFACE BETWEEN MEDIA

BACKGROUND OF THE INVENTION

1. Field of the Invention

The invention relates to a method for locating the interface between two fluids in an underground cavity.

2. Description of the Prior Art

In a typical well arrangement penetrating a salt cavity, there is, for example, protective casing cemented to the wall of the cavity with a second smaller diameter casing string concentric with the protective casing but penetrating deeper, and a third, even smaller casing string, concentric with the second casing string and penetrating yet further into the cavity.

In the above arrangement, the second casing string and the wall of the cavity form an annulus below the shoe of the cemented protective casing. In "washing out" such a salt cavity to enlarge it for use as a storage cavity, oil is placed into the annulus formed by the second casing string and the wall of the cavity. The bottom level of the oil is some distance above the shoe of the second casing string. Water is then pumped down the third (innermost) casing string into the cavity to dissolve salt from the cavity. The salt saturated water (brine) is then removed through the annulus formed between the second and third casing strings.

A known method of determining the interface between oil and brine in the annulus defined between the wall of the cavity and the second casing string is by gamma ray measurements, wherein the oil or the brine or an intermediate layer disposed in the interface area is provided with a source of gamma rays. The density of this intermediate layer which is to drop into the annulus through the one medium, preferably the oil, to the level of the other medium, preferably the brine, must range between the densities of the first and the second media and must not dissolve too quickly in either of these media. Thus, according to one known method synthetic balls containing a source of gamma rays are employed as the intermediate layer between the oil and the brine. Another known method employs labeled fresh water.

As mentioned before, when cavities are washed out, the annulus defined by the wall of the cavity and the second casing string contains an oil preventing a washing-out of the upper area of the salt formation. In order to avoid the production of oil with the brine through the annulus between the second and third casing strings, the interface between the oil and the brine is maintained if possible some distance above the shoe of the second casing string. The use of plastic balls comprising a source of gamma rays involves the disadvantage and risk that as the oil level drops to the level of the shoe of the second casing string, the plastic balls become stuck in the annulus between the second and third casing strings, and as a result the plastic balls will not follow the movements of the interface. Moreover, it is possible that with the dropping of the interface, the plastic balls pass into the interior of the protective tube string and if not stuck are produced with the oil-containing brine in an uncontrolled manner to the surface.

Likewise, the use of labeled fresh water involves uncertainties. If labeled fresh water is pumped into the annulus between the wall of the cavity and the second casing string, it divides itself into drops of various sizes. As a result, the drops fall through the oil to the surface of the brine at greatly varying rates. This labeled fresh water arriving at the upper level of the brine dissolves salt from the rock, thus becoming heavier and diffusing into the salt water filling the cavity. Therefore, at the time of measurement there may be insufficient labeled water available at the interface to determine its level.

It is an object of this invention to provide a method for determining by gamma-ray measurements an interface between media, especially between oil and brine, during the washing-out and operation of underground cavities, said method avoiding the afore-mentioned disadvantages of the prior art methods.

SUMMARY OF THE INVENTION

The invention comprises subjecting an aqueous solution which takes up an irradiating substance to gelation and placing this gel in the area of the interface between the two media where its emissions are detected.

The gel is formed above ground and is pumped into the annulus between the cavity wall and the second casing string containing the oil. The gel then sinks through the oil to the oil/brine interface without dispersing into droplets.

DESCRIPTION OF THE PREFERRED EMBODIMENTS

Particularly suitable aqueous solutions include those of highly polymeric materials which may be cross-linked by suitable substances and are converted to gels of the desired consistency. An example is polysaccharide which may be cross-linked with chromium chloride. Other suitable substances for use in forming such gels include guargum, alginates and partially hydrolyzed polyacrylates which may be cross-linked by salts of tri- or also di-valent cations such as calcium chloride, chromium chloride, aluminum sulfate, aluminum chloride and ferric chloride to name a few.

These gels are thixotropic and have the advantage of being pumpable and resuming a gel form when at rest. When migrating through the oil, such gels form large drops moving at only slightly different rates from each other and so are not lost by dispersion.

In a further embodiment of this invention, the method is characterized in that potassium chloride (KCl) is used in the solution to be gelled. The use of potassium chloride solution is particularly advantageous since potassium always contains the radioactive isotope $K^{40}$. As a rule, the amount of about 0.0118% of $K^{40}$ present in natural potassium will sufficiently label a gel having a highly concentrated amount of KCl at the interface area between the oil and the brine. Of course, it is permissable to use irradiate KCl to provide an even more easily detectable label. Other gamma radiation sources are acceptable also.

The gamma radiation generated by an intermediate layer of a 20% KCl solution while the cavity is being washed out with water, depends on the width of the annulus, i.e., the borehole diameter, and is attenuated by the two casing strings and the salt solution contained therein. In practice, the dose rate may be calculated as follows:

A 20% KCl solution having a density of 1.13 contains 226 kg of KCl per cubic meter, i.e., 118 kg of potassium (K) per cubic meter. The activity is 1 $\mu$Curie (Cu) per 1.23 kg K. that is, 96 $\mu$Cu per $m^3$ of 20% solution. For a layer thickness of 9cm, the calculated surface activity amounts to 8.4 $\mu$Cu/$m^2$. (Cf. Grodde and SCHRIMPF: Evidence of cement by labelling with gamma ray sources. Published in Erdol Zeitschrift 79, no. 2, 53–56, February 1963).

Attenuation may be brought about by two casing strings which together may have a wall thickness of 1.6 cm and by a 5 cm layer of brine amounts to 59% for the gamma radiation of $K^{40}$ having an energy of 1.46 MEV. Based on the dose rate inside the protective tube strings amounts to 2.75 $\mu$r/hr. This dose rate may be determined by using sensitive scintillometers as are used for measuring the gamma radiation of rocks. To attain maximum deflection of the scintillometer, the layer of gelled KCl solution should have a depth of at least one meter.

Unfavorable conditions can result in not clearly recognizing the gelled layer containing the KCl. Such unfavorable conditions include: (1) strong and irregular gamma ray emission from the rocks, (2) increased attenuation of the $K^{40}$ irradiation of the gel by the connections of the tube strings and the eccentric position of the tubes and (3) a narrow annulus between the rocks and the protective tube string, that is to say, small thickness of the gel layer. In such instances, the gel solution may be admixed with synthetic gamma-ray emitting substances including, for example, the following salts suitable for this purpose, the gamma-ray emitting isotope being indicated in parentheses $NH_4$ ($Br^{82}$), NaI ($I^{131}$), $CoCl_2$ ($Co^{60}O$, CsCl ($Cs^{137}$), $SbCl_3$ ($Sb^{124}$). In practice, it should be sufficient to increase the activity of the gel solution to 1 mCu per cubic meter. These synthetic gamma ray sources may be dissolved in a KCl solution, or in fresh water if a gel of lower density is desired.

I claim:

1. In a method for determining the location of an interface between media, wherein a source of gamma radiation is placed at said interface and its emissions are detected the improvement which comprises
using as said source of gamma radiation a gelled substance containing a source of gamma radiation.

2. A method as in claim 1 wherein said media having an interface to be detected are oil and brine.

3. A method according to claim 1 wherein said gelled substance is an aqueous solution with gamma ray emitting substances in such an amount that said gel has an activity of from about 0.085 to 1 mCu/m$^3$.

4. A method as in claim 1 wherein said gelled substance contains potassium chloride.

5. A method as in claim 4 wherein the potassium chloride is present in a concentration ranging from about 10 to 25 weight percent.

6. A method as in claim 1 wherein the gelled substance is gelled by dissolveing polysaccharide in an aqueous solution with the addition of chromium chloride.

* * * * *